United States Patent [19]

Heinemeyer et al.

[11] Patent Number: 4,612,156

[45] Date of Patent: Sep. 16, 1986

[54] SOLVENTLESS PROCESS FOR PRODUCING RESINOUS MATERIALS

[75] Inventors: Ben W. Heinemeyer, Lake Jackson; Sammy D. Tatum, Clute, both of Tex.

[73] Assignee: The Dow Chemical Company, Midland, Mich.

[21] Appl. No.: 799,689

[22] Filed: Nov. 19, 1985

Related U.S. Application Data

[63] Continuation-in-part of Ser. No. 706,065, Feb. 26, 1985, abandoned.

[51] Int. Cl.$^4$ ................................................ B29F 3/00
[52] U.S. Cl. ............................ 264/176 R; 264/331.12; 528/49; 528/73; 528/98; 528/99; 528/102; 528/106; 528/109; 528/110; 528/112; 528/115; 528/121; 528/122; 528/123; 528/124
[58] Field of Search ................. 264/176 R, 331.12; 425/204; 528/49, 73, 98, 99, 102, 106, 109, 110, 112, 115, 121, 122, 123, 124

[56] References Cited

U.S. PATENT DOCUMENTS 4,431,600 2/1984 Sakamoto et al. ............. 264/331.12
4,528,342 7/1985 Wilson ........................... 264/331.12

Primary Examiner—Maurice J. Welsh
Attorney, Agent, or Firm—J. G. Carter

[57] ABSTRACT

Resinous materials are produced in the substantial absence of a solvent by feeding to an extruder operated at a temperature sufficient to cause a reaction between the reactants (A) at least one material having an average of more than one vicinal epoxy group per molecule, (B) at least one material having an average of more than one group reactive with component (A) such as hydroxyl, thiol, carboxyl, isocyanate, thioisocyanate or secondary amine groups or a combination of such groups per molecule or a material having only one primary amine group per molecule, (C) at least one catalyst for promoting a reaction between components (A) and (B) if a catalyst is required to effect the reaction between components (A) and (B), and (D) optionally one or more chain terminators and thereafter recovering a resinous material resulting from the reaction between components (A) and (B) from said extruder.

This process is useful in preparing advanced epoxy resins and phenoxy thermoplastic resins.

30 Claims, No Drawings

SOLVENTLESS PROCESS FOR PRODUCING RESINOUS MATERIALS

CROSS REFERENCE TO RELATED APPLICATION

This is a continuation-in-part application of application Ser. No. 706,065 filed Feb. 26, 1985 now abandoned.

BACKGROUND OF THE INVENTION

The present invention pertains to a process for preparing resinous products from epoxy-containing materials and materials containing hydroxyl, thiol, carboxyl, isocyanate, thioisocyanate or secondary amine groups or a combination of such groups.

Linear polyhydroxy ether resins, i.e. thermoplastic epoxy resins also known as phenoxy resins and advanced epoxy resins have been produced and sold for a long time. Generally, they are produced and often sold in a solvent (25 or 50% concentrations) to reduce their viscosity. The primary reason for this is that as the molecular weight increases, the viscosity increases significantly. The process commonly used is a batch process using large kettles. Also, with the batch process there is a continuing product reaction such that the first product removed from the kettle will vary from the last thus causing product inconsistencies. The mass of materials in large kettle reactors is further complicated by heat transfer, i.e., the heat of reaction is more difficult to control and localized high heats will cause adverse reactions to occur, i.e., crosslinking. Current commercial processes involving solution processes require substantial capital equipment to reduce the product to a powder or granular product. This involves successive solvent stripping and vacuum devolatilization and, in some cases, salt by-products need to be washed from the product before granulation. Even then the final product contains significant amounts of undesirable solvents, water, and other by-products.

The residual solvents cause numerous problems when the product is fabricated into a usable product, such as a film in coextrusion, or moldings. The residual volatiles require extensive vacuum drying to prevent voids in the film and molded articles. The hazard of solvents being released from a product during fabrication could cause a problem unless proper venting is employed. Solvents may have an adverse effect on polymer properties such as stability, color, haze, etc.

The present invention solves most of the problems associated with the batch solvent process, i.e. less capital requirement, reduced energy requirement, more product consistency and in the case of phenoxy resins, it permits the production of such resins which are higher in molecular weight. The present invention also provides greatly improved temperature control during the reaction which significantly reduces or eliminates undesirable crosslinking.

SUMMARY OF THE INVENTION

The present invention pertains to a process for preparing a resinous material which comprises (I) continuously feeding to an extruder operating at conditions to cause intimate mixing and at a temperature and pressure sufficient to cause a reaction between components (A) and (B) and for a time sufficient to produce the desired product, the following components either separately or in admixture (A) at least one material having an average of more than one vicinal epoxy group per molecule;

(B) at least one material having attached thereto an average of more than one group reactive with component (A) per molecule;

(C) a catalytic quantity of at least one catalyst for promoting the reaction between components (A) and (B) with the proviso that if components (A) and (B) are reactive one with the other in the absence of a catalyst, then this component (C) may be omitted; and (D) optionally one or more chain terminators for regulating the molecular weight of said resinous material; and (II) and thereafter forming the thus formed resinous material exiting from the extruder to the desired physical form by suitable means;

(i) components (A) and (B) are employed in quantities which provide a ratio of groups reactive with an epoxy group to epoxy group of from about 0.01:1 to about 5.0:1, preferably from about 0.1:1 to about 2.0:1, most preferably from about 0.3:1 to about 1.1:1;

(ii) component (D) is employed in quantities which provide a ratio of equivalent of component (D) to epoxy equivalent of from about 0:1 to about 0.5:1, preferably from about 0.01:1 to about 0.25:1, most preferably from about 0.01:1 to about 0.10:1; and (iii) when a material is employed which contains at least one epoxy group and at least one group which is reactive with an epoxy group, then it can, if desired, serve as both components (A) and (B).

DETAILED DESCRIPTION OF THE INVENTION

Suitable materials having an average of more than one vicinal epoxy group per molecule which can be employed in the process of the present invention include, for example, those represented by the formulas

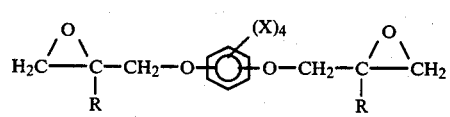

I.

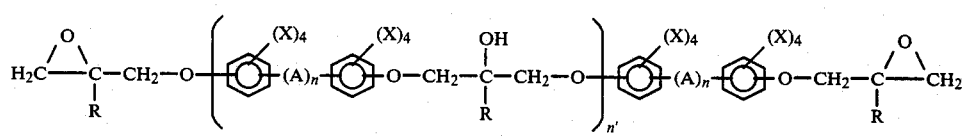

II.

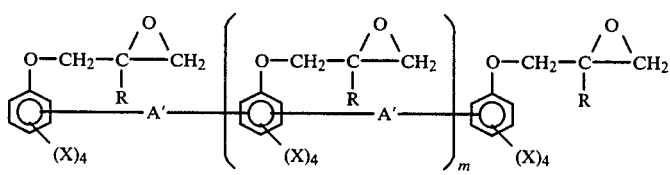

III.

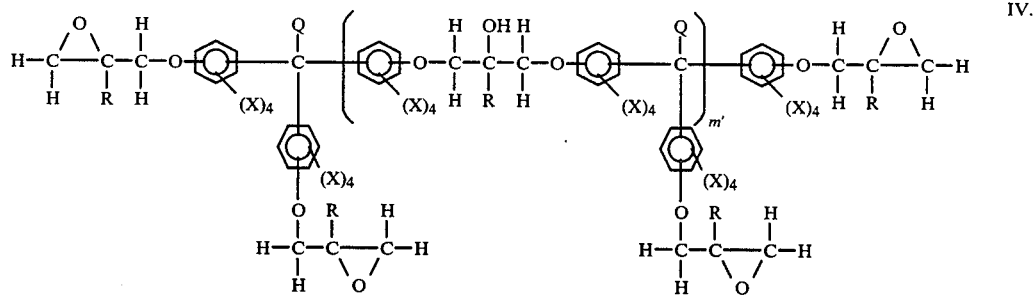

IV.

wherein each A is independently a divalent hydrocarbyl group having from 1 to about 10, preferably from 1 to about 6 carbon atoms,

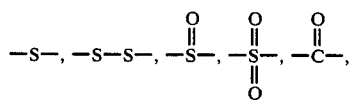

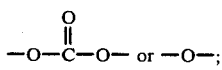

each A' is independently a divalent hydrocarbyl group having from 1 to about 10, preferably from 1 to about 6 carbon atoms; each R is independently hydrogen or a hydrocarbyl group having from 1 to about 4 carbon atoms; each Q is independently hydrogen or a hydrocarbyl group having from 1 to about 5, preferably 1 carbon atom; each X is independently hydrogen, a halogen, preferably chlorine or bromine, or a hydrocarbyl or hydrocarbyloxy group having from 1 to about 12 carbon atoms; m has an average value of from about 0.001 to about 6, preferably from about 0.1 to about 3; m' has an average value of from zero to about 4, preferably from about 0.1 to about 2; n has a value of zero or 1; and n' has an average value of from about zero to about 15, preferably from zero to about 11.5. When the functionality of the epoxy resin is higher than about 2, they are employed in combination with an epoxy resin having a functionality of about 2 and is employed in small quantities with respect to the 2 functional material.

The term hydrocarbyl group means any aliphatic or cycloaliphatic or aromatic hydrocarbon group which consists of hydrogen and carbon atoms. Likewise, the term hydrocarbyloxy group means those compounds represented by the formula —OR wherein R is a hydrocarbyl group as above defined.

Particularly suitable epoxy-containing materials include the glycidyl ethers of polyhydric phenols such as resorcinol, catechol, hydroquinone, bisphenol A, bisphenol F, bisphenol K, tris-hydroxyphenyl methane, 2,6,2',6'-tetrabromo-p,p'-bisphenol A, 2,6,2',6'-tetramethyl-3,5,3'-tribromo-p,p'-biphenol, 2,6,2',6'-tetramethyl-3,5,3',5'-tetrabromo-p,p'-biphenol, tetramethylbiphenol, bisphenol E, mixtures thereof and the like.

Suitable materials which contain groups reactive with the epoxy-containing material include, for example, those materials which contain an average of more than one organic hydroxyl, thiol, carboxyl, isocyanate, thioisocyanate or secondary amine group or any combination of such groups per molecule and those materials which contain only one primary amine group per molecule. These materials can be aliphatic or aromatic.

Suitable polyhydric phenolic compounds which can be employed herein include, for example, those represented by the formulas

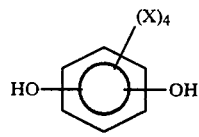

V.

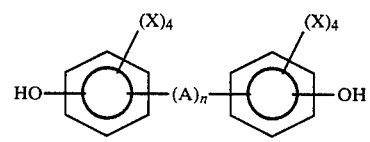

VI.

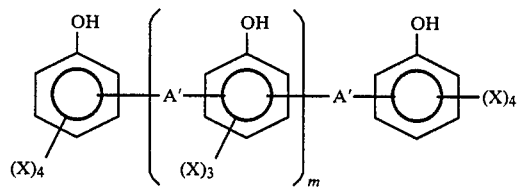

VII.

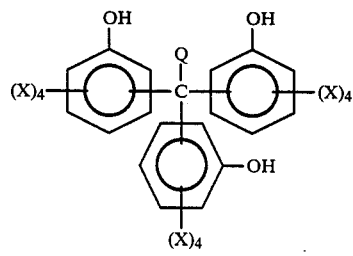

VIII.

wherein A, A', Q, X, n and m are as hereinbefore defined.

Particularly suitable polyhydric phenolic materials include, for example, resorcinol, catechol, hydroquinone, bisphenol A, bisphenol F, bisphenol K, bisphenol S, dihydroxybiphenyl, tris-hydroxyphenyl methane, 2,6,2',6'-tetrabromo-p,p'-bisphenol A, 2,6,2',6'-tetramethyl-3,5,3'-tribromo-p,p'-biphenol, 2,6,2',6'-tetramethyl-3,5,3',5'-tetrabromo-p,p'-biphenol, tetramethyl biphenol, bisphenol E, mixtures thereof and the like.

Suitable —COOH containing materials include dicarboxylic acids such as, for example, malonic acid, succinic acid, maleic acid, terephthalic acid, dinicotinic acid, mixtures thereof and the like.

Suitable materials containing thiol (—SH) groups include, for example, the thiol analogs to the aforementioned hydroxyl-containing materials. Particularly suitable thiol materials include, for example, 1,4-dimercaptobenzene, 1,3-dimercaptobenzene, 1,2-dimercaptobenzene, ethylene mercaptan, 1,3-propanedithiol, 1,4-butanedithiol, mixtures thereof and the like.

Suitable materials containing isocyanate groups include any isocyanate-containing material such as aromatic or aliphatic or cycloaliphatic isocyanate-containing materials. Particularly suitable isocyanate-containing materials include, for example, hexamethylene-1,6-diisocyanate, benzene-1,4-diisocyanate, toluenediisocyanate, methylenediphenylisocyanate, mixtures thereof and the like.

Suitable materials containing thiocyanate groups include, for example, the thiol analogs to the aforementioned isocyanate-containing materials. Particularly suitable thiol materials include, for example, hexamethylene-1,6-dithiocyanate, benzene-1,4-dithiocyanate, toluenedithiocyanate, methylenediphenylthiocyanate, mixtures thereof and the like.

Suitable materials containing secondary amine groups include any aromatic or aliphatic or cycloaliphatic secondary amine-containing materials. Particularly suitable secondary amine-containing materials include, for example, piperazine, ethoxylated ethylenediamine, mixtures thereof and the like.

Particularly suitable materials which contain only one primary amine group per molecule include, for example, aniline, halogenated and alkylated aniline, hexylamine, heptylamine, long chain aliphatic amine, cyclohexylamine, cycloheptylamine and alkylated cyclicamine, mixtures thereof and the like.

Suitable catalysts for effecting the reaction between the epoxy resin and the phenolic hydroxyl-containing materials include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216 and 4,366,295, all of which are incorporated herein by reference.

Particularly suitable catalysts are those quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate.acetic acid complex), ethyltriphenylphosphonium phosphate, tetrabutylphosphonium chloride, tetrabutylphosphonium bromide, tetrabutylphosphonium iodide, tetrabutylphosphonium acetate, tetrabutylphosphonium diacetate (tetrabutylphosphonium acetate.acetic acid complex), butyltriphenylphosphonium tetrabromobisphenate, butyltriphenylphosphonium bisphenate, butyltriphenylphosphonium bicarbonate, benzyltrimethylammonium chloride and tetramethylammonium hydroxide.

Other suitable catalysts include tertiary amines such as, for example, triethylamine, tripropylamine, tributylamine, 2-methylimidazole, benzyldimethylamine, mixtures thereof and the like.

The amount of catalyst depends, of course, upon the particular reactants and catalyst employed; however, it is usually employed in quantities of from about 0.03 to about 3, preferably from about 0.3 to about 1.5, most preferably from about 0.05 to about 1.5 percent by weight based upon the weight of the epoxy-containing material. The catalyst may, if desired so as to facilitate metering and the like, be employed in a solvent. The small quantities of solvent will not therefore be significant so as to cause deleterious effects on the process or resultant product.

Suitable chain terminators which can be employed herein, so as to control the molecular weight include, for example, monofunctional phenolic compounds, monofunctional carboxylic acids, aromatic or aliphatic secondary amines, mercaptans, isocyanates, isothiocyanates, epoxy compounds, mixtures thereof and the like.

Suitable monohydric phenolic compounds include, for example, those represented by the formula

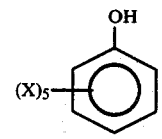

IX.

wherein each X is as hereinbefore defined.

Suitable monocarboxylic acids which can be employed herein as chain terminators include those aliphatic saturated or unsaturated carboxylic acids having from about 2 to about 20 carbon atoms such as, for example, ethanoic acid, propionic acid, benzoic acid, 2-phenanthrene carboxylic acid, stearic acid, talloil acid, mixtures thereof and the like.

Suitable aromatic or aliphatic or aromatic secondary amines which can be employed herein as chain terminators include, for example, diethylamine, dipropylamine, methylpropylamine, diphenylamine, piperadine, morpholine, mixtures thereof and the like.

Suitable monoisocyanates which can be employed herein as chain terminators include, for example, methylisocyanate, ethylisocyanate, α-naphthalisocyanate, tertiary butylisocyanate, para-tolylisocyanate, phenylisocyanate, mixtures thereof and the like.

Suitable monoisothiocyanates which can be employed herein as chain terminators include, for example, methylisothiocyanate, ethylisothiocyanate, isopropylisothiocyanate, phenylisothiocyanate, mixtures thereof and the like.

Suitable monomercaptans which can be employed herein as chain terminators include, for example, octyl, dodecyl, ethyl, propyl, butyl, benzyl, mercaptans, mixtures thereof and the like.

Suitable monoepoxy compounds which can be employed as chain terminators, include, for example, ethylene oxide, propylene oxide, butyl glycidyl ether, octyl glycidyl ether, mixtures thereof and the like.

Particularly suitable chain terminators include, for example, phenol, p-tertiary butyl phenol, nonyl phenol, stearic acid, talloil acid, octyl and dodecyl mercaptans, butyl glycidyl ether, octyl glycidyl ether, phenyl isocyanate, mixtures thereof and the like.

Vinyl ester resins can be prepared by the process of the present invention by employing as component (D) a monocarboxylic unsaturated acid such as, for example, acrylic acid, methacrylic acid and the like. In this instance, said acid would be added to the extruder at the point at which the desired product from the reaction of components (A) and (B) has been achieved.

The reaction can be conducted at a temperature of from about 90° C. to about 280° C., preferably from about 120° C. to about 250° C., most preferably from about 180° C. to about 250° C.

The reaction is conducted at the selected temperature for a time sufficient to produce the desired product. However, the time is usually from about 0.03 hour (108 s) to about 5 hours (18000 s), preferably from about 0.03 hour (108 s) to about 0.2 hour (720 s), most preferably from about 0.03 hour (108 s) to about 0.05 hour (180 s).

Since the reaction is dependent upon catalyst, temperature and time, the extruder length is important with regard to residence time which depends upon the temperature, catalyst, throughput of the reactants and extruder length. The residence time can be affected by changes of the screw configuration, i.e., screw elements that hinder flow will increase residence time and conversely, screw elements that accelerate flow will decrease residence time. Screw elements with back mixing capability and elements with more flight revolutions per given screw length are examples of screw configurations that increase residence time. Screw elements with fewer screw flight revolutions per given screw length decrease the residence time. Screw speed affects residence time. At slower speeds (rpm) the residence time increases and conversely at higher speeds the residence time decreases. All the factors effecting residence time are considered in developing an optimized screw configuration to give the specific desired reaction of the raw materials.

Although any extruder would be suitable in the process of the present invention over a short period of time, it is preferred, so as to prevent build-up on the screw(s), to employ an extruder having a multiplicity of self-wiping or self-cleaning screws. An intermeshing multi-screw extruder is desired to be employed in the present invention, whether the screws are co-rotating or counter-rotating, due to the screws and walls of the extruder being continuously wiped so that there is little or no chance for build-up (gel formation or crosslinking) on the walls of the extruder or behind the flights of the screws as could occur on single screw extruders. This continuous wiping action of the wall and screws also contributes to better mixing which is necessary to encourage the desired reaction between the reactants. In a reaction between phenolic hydroxyl groups and epoxy groups, good mixing is required so as to encourage the desired phenolic hydroxyl/epoxy reaction over the competing alcoholic or aliphatic hydroxyl/epoxy reaction. The higher the molecular weight becomes, more alcoholic hydroxyls become available and less phenolic hydroxyls remain; therefore, the mixing becomes more and more desirable as well as more difficult due to the increase in viscosity. This problem is handled quite adequately by an intermeshing multi-screw extruder with a screw designed for good mixing throughout the full length of the extruder.

If desired, fillers, pigments, flow control agents, heat stabilizers, light stabilizers, plasticizers, flame retardants, antioxidants and/or other additives can be added.

The reaction is conducted at a pressure of from about 1 to about 5000 psig (7 to 34,474 kPa), preferably from about 50 to about 2500 psig (345 to 17,237 kPa), most preferably from about 100 to about 500 psig (689 to 3447 kPa).

The following examples are illustrative of the present invention.

EXTRUDER DESCRIPTION

The extruder-reactor used in the following examples was a Werner-Pfleiderer ZSK-30 intermeshing, co-rotating twin screw extruder. The extruder barrel was 1140 millimeters in length excluding the die. The extruder barrel had an internal diameter of 30 millimeters making the length to diameter ratio 38/1. The barrel consisted of 12 barrel sections and two guide plates. In the 12 sections there was a feed section; three sections that could be used as vacuum or vent ports, injection ports, melt temperature ports or plugged to become solid sections; and eight solid sections. The barrel configuration used for this process was a feed port section, two solid sections, guide plate, melt temperature port section, six solid sections, vent port section, one solid section, guide plate, and die section. There were five intensive mixing sections designed into the screws which were 1154 millimeters long excluding the screw tips. It should be noted that the screws extended into the die section of the barrel. The barrel was divided into six heating and cooling zones excluding the feed port section which was individually cooled. The sixth zone included the die section of the barrel. The zones were electrically heated and water cooled. A temperature controller was used to control the barrel temperature of each zone. The melt temperature was measured in the fourth barrel section and at the die.

EXAMPLE 1

Diglycidyl ether of bisphenol A (EEW=173.4) and p,p'-bisphenol A were added in an equivalent ratio of 1.03:1.00 to a reactor vessel. The materials were added in order and 1 milliequivalent of ethyl triphenyl phosphonium acetate.acetic acid complex catalyst per equivalent of bisphenol A was added on top of the p,p'-bisphenol A. The catalyst was employed as a 70% solution in methanol. The charge to the kettle was as follows:

epoxy resin: 35.7 lbs, 0.206 # equiv. (16.19 kg, 93.6 g equiv.)

bisphenol A: 22.8 lbs, 0.200 # equiv. (10.34 kg, 90.72 g equiv.)

Catalyst Solution: 47 grams 0.000177 # equiv. (0.08 g equiv.)

The vessel was purged with nitrogen by pressuring to 20 psig (137.9 kPa) and releasing down to 5 psig (34.5 kPa) three times. The vessel was then pressured to 15 psig and held there. The agitator was on during the purging operation. The vessel was heated to 100° C. and the melt temperature controlled below 110° C. during the reaction. Samples were taken every 30 minutes (1800 s) after the melt reached 100° C. and an epoxide analysis was run. When the epoxide had dropped to about 8%, 189 grams of catalyst solution (0.0008 # equivalents, 0.323 g equiv.) was added to the vessel and allowed to mix for 5 minutes (300 s) before pressuring the vessel contents out into metal pans. The melt was approximately ¾" (1.9 cm) thick in each pan. After the melt cooled to a brittle state, it was dumped out of the pans and ground into a coarse powder. The powder was fed to a Werner Pfleiderer twin screw extruder (see Extruder Description). The various heat zones were controlled to keep the melt temperature below 200° C. and the feed rate and screw speed were controlled to give an average residence time in the extruder of 2½-3 minutes (150-180 s). The material was stranded, water cooled, and pelletized. This material had a weight average molecular weight of 25,000.

The pellets were then extruded through the same extruder at the same conditions as the powder and the resulting material had a weight average molecular weight of 27,000.

EXAMPLE 2

Diglycidyl ether of bisphenol A (EEW=182) and p,p'-bisphenol A were added to a vessel in a molar ratio of 1:1. The procedure used in Example 1 was followed in this example. The charge to the kettle was as follows:
epoxy resin: 36.1 #, 0.198 # equiv. (16.375 kg, 89.97 g equiv.)
bisphenol A: 22.6 #, 0.198 # equiv. (10.251 kg, 89.92 g equiv.)
Catalyst Solution: 47.2 gms (0.000178 # equiv.) (0.08 g equiv.)
An additional 188.8 gms (0.00071 # equiv., 0.324 g equiv.) of catalyst solution was added at about 7% epoxide and mixed for five minutes (300 s).

The powder prepared from this reaction was fed through the same extruder as used in Example 1. The same conditions were used in this extrusion as in Example 1. The material had a weight average molecular weight of 35,000. These pellets were reextruded doubling the screw speed. The weight average molecular weight of the reextruded material was 37,000.

The physical properties of the material produced in Example 2 were:
Melt Index, ASTM D 1238 condition R, grams/10 min. @ 235° C.: 9.85
Heat Distortion, °C.: 83°
Notched Izod Impact,
 ft-lb/in: 1.38
 J/cm: 0.74
Tensile Strength,
 lbs/in$^2$: 9,785
 kPa: 67,466
Elongation, %: 8.3
Modulus,
 lbs/in$^2$: 553,000
 kPa: 3,812,824

EXAMPLE 3

Diglycidyl ether of bisphenol A (EEW=182) and p,p'-bisphenol A (eq. wt.=114) were thoroughly mixed to form a slurry after the catalyst had been mixed into the diglycidyl ether of bisphenol A. The catalyst used was a 70% solution in methanol of ethyltriphenylphosphonium acetate.acetic acid complex. The slurry consisted of the following ratios:
epoxy resin: 5.46#, 0.03# equiv. (13.608 g equiv.)
bisphenol A: 3.42#, 0.03# equiv. (13.608 g equiv.)
catalyst solution: 39.1 gms, 0.0668 g. equiv.
The slurry was then fed to the Werner Pfleiderer extruder (see Extruder Description) by means of a small three-quarter inch single screw extruder. No heat was used on the single screw extruder, it was simply used as a pump. The conditions on the Werner Pfleiderer extruder were: ambient temperature at the feed throat, 140° C. on the first heat section, and 175° C. on the last five sections, the last one being the die section, the rpm was 100 and the feed rate was 7-7.5#/hr. The final melt temperature was 185°-186° C. at the die. The % epoxide on this material was 0.19% to 0.25% and the molecular weight was 30,000 weight average molecular weight.

EXAMPLE 4

Diglycidyl ether of bisphenol A (EEW=186) was mixed with ethyltriphenylphosphonium acetate.acetic acid catalyst complex (70% solution in methanol) in the following ratio:
epoxy resin: 23.4 #, (57.1 gm equiv.)
catalyst solution: 36.4 gms, (0.0622 gm equiv.)
The mixture was then pumped to the Werner Pfleiderer extruder in the fourth barrel section while resin grade bisphenol A (ER Grade) was fed in the first barrel section of the Werner Pfleiderer extruder. The feed ratios were as follows:
epoxy resin, catalyst solution: 5.01 #/hr (12.25 gm equiv.)
epoxy resin Grade bisphenol A: 2.13 #/hr (8.5 gm equiv.)
The conditions on the Werner Pfleiderer extruder were: ambient temperature at the feed throat, 140° C. on the first heat section and 175° C. on the last five sections, the rpm was 100 and the total feed to the extruder (resin and bisphenol A) was about 7.14 #/hr. This feed rate varied due to inconsistency of the bisphenol A feeder. The percent epoxide ranged from 4.06 to 5.08 due to the inconsistency of the bisphenol A feed. The epoxy equivalent weight ranged from 846 to 1059 and the softening point ran from 106 to 114.

EXAMPLE 5

Diglycidyl ether of bisphenol A (EEW=181), p,p'-bisphenol A and para-tertiary butyl phenol were added in an equivalent ratio of 1.01:1.00:0.013 to a reactor vessel. The materials were added in order and 1 milliequivalent of ethyltriphenylphosphonium acetate.acetic acid complex catalyst per equivalent of bisphenol A was added on top of the p,p'-bisphenol A. The catalyst was employed as a 70% solution in methanol. The equivalent weight of the diglycidyl ether of bisphenol A was 181. The charge to the kettle was as follows:
epoxy resin: 36.1 #, 0.1995 # equiv. (90.5 gm equiv.)
bisphenol A: 22.5 #, 0.1973 # equiv. (89.7 gm equiv.)
para-tertiary butyl phenol: 177 gms, 0.0026 # equiv. (1.18 gm equiv.)
The vessel was purged with nitrogen. The vessel was then pressured to 15 psig and held there. The agitator was on during the purging operation. The vessel was heated to 100° C. and the melt temperature controlled below 110° C. during the reaction. Samples were taken every 30 minutes (1800 s) after the melt reached 100° C. and an epoxide analysis was run. When the epoxide dropped to about 6%, 188.8 gms of catalyst solution (0.0008 # equivalent, 0.323 gm equivalent) was added to the vessel and allowed to mix for 5 minutes (300 s) before pressuring the vessel content out into metal pans as described in Example 1.

The material was ground into a powder after it had cooled in the pans. This powder was then extruded through the Werner Pfleiderer extruder at a rate of 6 #/hour and a residence time of 2½-3 minutes (150-180 s). The melt temperature was held below 190° C. The material was stranded, water cooled, and pelletized.

This material had a weight average molecular weight of 30,497 and a polydispersity of 3.64. Note decrease in molecular weight compared to Example 2 (37,000).

EXAMPLE 6

Diglycidyl ether of bisphenol A (EEW=182) and 2,6,2′,6′-tetrabromo-p,p′-bisphenol A (eq. wt.=272) were thoroughly mixed to form a slurry. The raw material had the following ratios:
epoxy resin: 4.15 #, 0.0228 # eq. (10.30 gm equiv.)
bisphenol: 5.99 #, 0.02185 # eq. (10.00 gm equiv.)
catalyst solution: 20.28 gm, (34.62 gm equiv.)

The slurry was then fed to the Werner & Pfleiderer extruder which consisted of epoxy resin and bisphenol A by means of a Moyno pump. The slurry entered the Werner & Pfleiderer extruder at the feed throat section. The catalyst used was a 70% solution in methanol of ethyltriphenylphosphonium acetate.acetic acid complex. This catalyst solution was pumped to the Werner & Pfleiderer extruder by means of a Whitey diaphragm pump. The catalyst stream also entered the extruder at the feed throat. The catalyst solution feed rate was 30 grams per hour (0.0083 g/s) while the slurry feed rate was 15 # per hour (1.89 g/s). The conditions on the Werner & Pfleiderer extruder were: ambient temperature at the feed throat, 175° C. on the first three heat zones, 185° C. on the fourth heat zone, 195° C. on the fifth heat zone and 205° C. at the die. The screw rpm was 100. The % epoxide on this material was 0.25% and the molecular weight was 53,471 weight average molecular weight with a polydispersity of 2.84.

The physical properties of the material produced in Example 6 were:
Melt Index, ASTM D 1238 Condition R, grams/10 min. @ 235° C.: 2
Heat Distortion, °C.: 110.9
Notched Izod Impact,
 ft. lb/in: 0.76
 J/cm: 0.41
Tensile Strength,
 lbs/in$^2$: 10,975
 kPa: 75,750
Elongation, %: 5
Modulus,
 lbs/in$^2$: 334,215
 kPa: 2,305,000

EXAMPLE 7

Diglycidyl ether of bisphenol A (EEW=181) and 2,6,2′,6′-tetramethyl-3,5,3′,5′-tetrabromo-p,p′-biphenol were thoroughly mixed to form a slurry. The raw material had the following ratios:
epoxy resin: 4.11 #, 0.0226 # eq. (10.30 gm equiv.)
biphenol: 6.145 #, 0.0219 # eq. (10.00 gm equiv.)
catalyst solution: 30.88 gm, (52.71 gm equiv.)

The slurry was then fed to the Werner & Pfleiderer extruder which consisted of epoxy resin and bisphenol A by means of a Moyno pump. The slurry entered the Werner & Pfleiderer extruder at the feed throat section. The catalyst used was a 70% solution in methanol of ethyltriphenylphosphonium acetate.acetic acid complex. This catalyst solution was pumped to the Werner & Pfleiderer extruder by means of a Whitey diaphragm pump. The catalyst stream also entered the extruder at the feed throat. The catalyst solution feed rate was 28 grams per hour (0.0077 g/s) while the slurry feed rate was 9.3 lbs./hour (1.17 g/s). The conditions on the Werner & Pfleiderer extruder were: ambient temperature at the feed throat, 175° C. on the first four heat zones, and 215° C. on zone 5 and the die. The screw rpm was 100. The weight average molecular weight was 58,163 and a polydispersity of 3.56.

The physical properties of the material produced in Example 7 were:
Melt Index, ASTM D 1238 Condition R, grams/10 min. @ 235° C.: 0.8
Heat Distortion, °C.: 130
Notched Izod Impact,
 ft. lb/in: 1.1
 J/cm: 0.59
Tensile Strength,
 lbs/in$^2$: 9,777
 kPa: 67,400
Elongation, %: 12.6

We claim:

1. A process for preparing a resinous material which comprises
   (I) continuously feeding to an extruder operating at a temperature and pressure sufficient to cause a reaction between components (A) and (B) and for a time sufficient to produce the desired product, the following components either separately or in admixture in any combination
      (A) at least one material having an average of more than one vicinal epoxy group per molecule;
      (B) at least one material having attached thereto an average of more than one moiety reactive with component (A) per molecule;
      (C) a catalytic quantity of at least one catalyst for promoting the reaction between components (A) and (B) with the proviso that if components (A) and (B) are reactive one with the other in the absence of a catalyst, then this component (C) may be omitted, if desired; and
      (D) optionally one or more chain terminators; and
   (II) and thereafter forming the thus formed resinous material exiting from the extruder to the desired physical form by suitable means; and wherein
      (i) components (A) and (B) are employed in quantities which provide a ratio of groups reactive with an epoxy group to epoxy group of from about 0.01:1 to about 5:1;
      (ii) component (D) is employed in quantities which provide a ratio of equivalent of component (D) to epoxy equivalent of from about 0:1 to about 0.5:1; and
      (iii) when a material is employed which contains at least one epoxy group and at least one group which is reactive with an epoxy group, then it can, if desired, serve as both components (A) and (B).

2. A process of claim 1 wherein
   (i) components (A) and (B) are employed in quantities which provide a ratio of groups reactive with an epoxy group of from about 0.1:1 to about 2:1; and
   (ii) component (D) is employed in quantities which provide an equivalent ratio of component (D) to component (A) of from about 0.01:1 to about 0.25:1.

3. A process of claim 1 wherein
   (i) components (A) and (B) are employed in quantities which provide a ratio of groups reactive with an epoxy group of from about 0.3:1 to about 1.1:1; and
   (ii) component (D) is employed in quantities which provide an equivalent ratio of component (D) to component (A) of from about 0.01:1 to about 0.1:1.

4. A process of claim 1 wherein said extruder is operated at a temperature of from about 90 to about 280° C. and a pressure of from about 1 to about 5000 psig and wherein said extruder has a multiplicity of self-cleaning screws.

5. A process of claim 2 wherein said extruder is operated at a temperature of from about 120° to about 250° C. and a pressure of from about 50 to about 2500 psig and wherein said extruder has a multiplicity of self-cleaning screws.

6. A process of claim 3 wherein said extruder is operated at a temperature of from about 180° to about 250° C. and a pressure of from about 100 to about 500 psig and wherein said extruder has a multiplicity of self-cleaning screws.

7. A process of claim 1 wherein component (B) is a material which has an average of more than one hydroxyl, thiol, carboxyl, isocyanate, thioisocyanate or secondary amine group or combination of such groups per molecule or a single primary amine group per molecule.

8. A process of claim 2 wherein component (B) is a material which has an average of more than one hydroxyl, thiol, carboxyl, isocyanate, thioisocyanate or secondary amine group or combination of such groups per molecule or a single primary amine group per molecule.

9. A process of claim 3 wherein component (B) is a material which has an average of more than one hydroxyl, thiol, carboxyl, isocyanate, thioisocyanate or secondary amine group or combination of such groups per molecule or a single primary amine group per molecule.

10. A process of claim 4 wherein component (B) is a material which has an average of more than one hydroxyl, thiol, carboxyl, isocyanate, thioisocyanate or secondary amine group or combination of such groups per molecule or a single primary amine group per molecule.

11. A process of claim 5 wherein component (B) is a material which has an average of more than one hydroxyl, thiol, carboxyl, isocyanate, thioisocyanate or secondary amine group or combination of such groups per molecule or a single primary amine group per molecule.

12. A process of claim 6 wherein component (B) is a material which has an average of more than one hydroxyl, thiol, carboxyl, isocyanate, thioisocyanate or secondary amine group or combination of such groups per molecule or a single primary amine group per molecule.

13. A process of claim 7 wherein
 (i) component (A) is a material represented by the following formulas (I) or (II)

or a combination of such materials wherein each A is independently a divalent hydrocarbyl group having from 1 to about 10 carbon atoms,

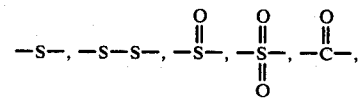

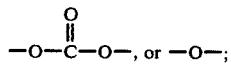

each R is independently hydrogen or a hydrocarbyl group having from 1 to about 4 carbon atoms; each X is independently hydrogen, a halogen or a hydrocarbyl or hydrocarbyloxy group having from 1 to about 12 carbon atoms; n has a value of zero or 1; and n' has an average value of from about zero to about 15;

(ii) component (B) is a material represented by the following formula (VI)

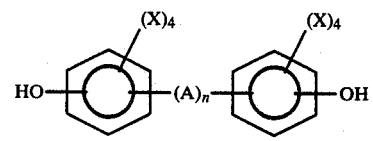

wherein each A is independently a divalent hydrocarbyl group having from 1 to about 10 carbon atoms,

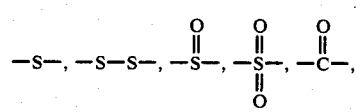

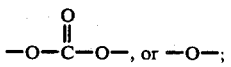

each X is independently hydrogen, a halogen or a hydrocarbyl or hydrocarbyloxy group having from 1 to about 12 carbon atoms; and n has a value of zero or 1; and (iii) component (D), when present, is represented by the following formula (IX)

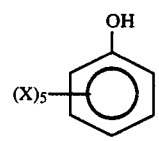

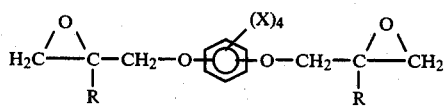

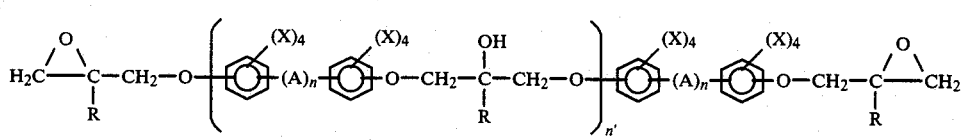

wherein each X is independently hydrogen or a hydrocarbyl or hydrocarbyloxy group having from 1 to about 12 carbon atoms.

14. A process of claim 13 wherein
(i) component (A) is represented by formula II wherein each A is independently a divalent hydrocarbyl group having from 1 to about 4 carbon atoms, each R is hydrogen, each X is independently hydrogen or bromine, n has a value of 1 and n' has an average value of from about 0.003 to about 2;
(ii) in component (B), A is a divalent hydrocarbyl group having from 1 to about 4 carbon atoms, each X is independently hydrogen or bromine and n has a value of 1; and
(iii) in component (D), each X is independently hydrogen or a hydrocarbyl group having from 3 to about 10 carbon atoms.

15. A process of claim 14 wherein
(i) component (A) is a diglycidyl ether of bisphenol A;
(ii) component (B) is bisphenol A or tetrabromobisphenol A or a combination thereof; and
(iii) component (D), when present, is p-tertiary butyl phenol, phenol, nonyl phenol, or combination thereof.

16. A process of claim 8 wherein
(i) component (A) is a material represented by the following formulas (I) or (II)

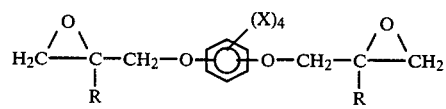

I.

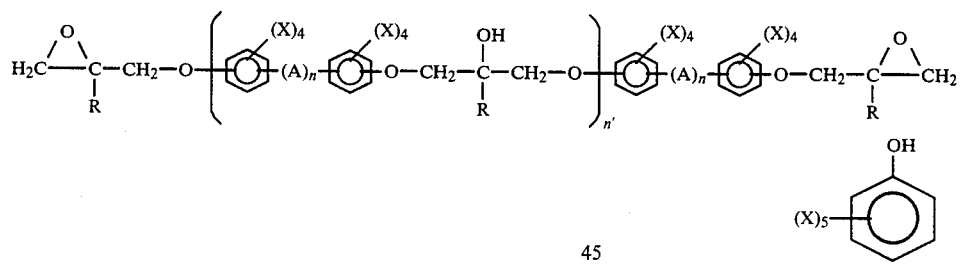

II.

or a combination of such materials wherein each A is independently a divalent hydrocarbyl group having from 1 to about 10 carbon atoms, $$-S-,\ -S-S-,\ -\underset{\underset{O}{\|}}{\overset{O}{\|}}S-,\ -\underset{O}{\overset{O}{\|}}S-,\ -\overset{O}{\overset{\|}{C}}-,$$

$$-O-\overset{O}{\overset{\|}{C}}-O-,\ \text{or}\ -O-;$$

each R is independently hydrogen or a hydrocarbyl group having from 1 to about 4 carbon atoms; each X is independently hydrogen, a halogen or a hydrocarbyl or hydrocarbyloxy group having from 1 to about 12 carbon atoms; n has a value of zero or 1; and n' has an average value of from about zero to about 15;
(ii) component (B) is a material represented by the following formula (VI)

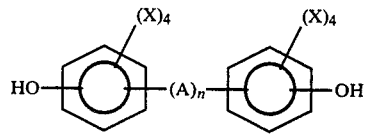

VI.

wherein each A is independently a divalent hydrocarbyl group having from 1 to about 10 carbon atoms,

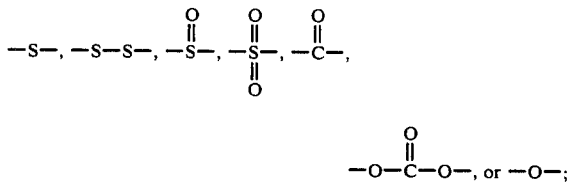

each X is independently hydrogen, a halogen or a hydrocarbyl or hydrocarbyloxy group having from 1 to about 12 carbon atoms; and n has a value of zero or 1; and
(iii) component (D), when present, is represented by the following formula (IX)

IX.

$$(X)_5-\underset{}{\overset{}{\bigcirc}}-OH$$

wherein each X is independently hydrogen or a hydrocarbyl or hydrocarbyloxy group having from 1 to about 12 carbon atoms.

17. A process of claim 16 wherein
(i) component (A) is represented by formula II wherein each A is independently a divalent hydrocarbyl group having from 1 to about 4 carbon atoms, each R is hydrogen, each X is independently hydrogen or bromine, n has a value of 1 and n' has an average value of from about 0.003 to about 2;
(ii) in component (B), A is a divalent hydrocarbyl group having from 1 to about 4 carbon atoms, each X is independently hydrogen or bromine and n has a value of 1; and
(iii) in component (D), each X is independently hydrogen or a hydrocarbyl group having from 3 to about 10 carbon atoms.

18. A process of claim 17 wherein
(i) component (A) is a diglycidyl ether of bisphenol A;
(ii) component (B) is bisphenol A or tetrabromobisphenol A or a combination thereof; and (iii) component (D), when present, is p-tertiary butyl phenol, phenol, nonyl phenol, or combination thereof.

19. A process of claim 9 wherein
(i) component (A) is a material represented by the following formulas (I) or (II)

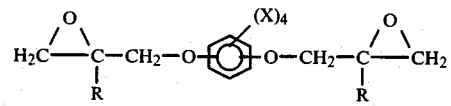
I.

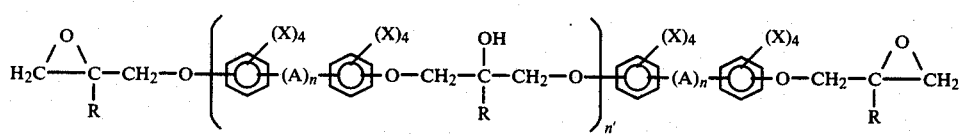
II.

or a combination of such materials wherein each A is independently a divalent hydrocarbyl group having from 1 to about 10 carbon atoms,

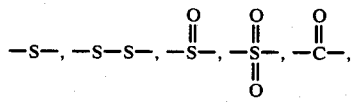

$$-O-\overset{O}{\underset{\|}{C}}-O-, \text{ or } -O-;$$

each R is independently hydrogen or a hydrocarbyl group having from 1 to about 4 carbon atoms; each X is independently hydrogen, a halogen or a hydrocarbyl or hydrocarbyloxy group having from 1 to about 12 carbon atoms; n has a value of zero or 1; and n' has an average value of from about zero to about 15;

(ii) component (B) is a material represented by the following formula (VI)

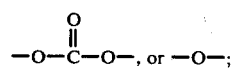
VI.

wherein each A is independently a divalent hydrocarbyl group having from 1 to about 10 carbon atoms,

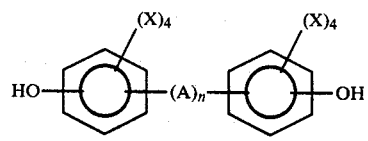

$$-O-\overset{O}{\underset{\|}{C}}-O-, \text{ or } -O-;$$

each X is independently hydrogen, a halogen or a hydrocarbyl or hydrocarbyloxy group having from 1 to about 12 carbon atoms; and n has a value of zero or 1; and (iii) component (D), when present, is represented by the following formula (IX)

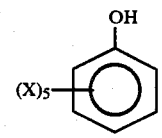
IX.

wherein each X is independently hydrogen or a hydrocarbyl or hydrocarbyloxy group having from 1 to about 12 carbon atoms.

20. A process of claim 19 wherein
(i) component (A) is represented by formula II wherein each A is independently a divalent hydrocarbyl group having from 1 to about 4 carbon atoms, each R is hydrogen, each X is independently hydrogen or bromine, n has a value of 1 and n' has an average value of from about 0.003 to about 2;
(ii) in component (B), A is a divalent hydrocarbyl group having from 1 to about 4 carbon atoms, each X is independently hydrogen or bromine and n has a value of 1; and
(iii) in component (D), each X is independently hydrogen or a hydrocarbyl group having from 3 to about 10 carbon atoms.

21. A process of claim 20 wherein
(i) component (A) is a diglycidyl ether of bisphenol A;
(ii) component (B) is bisphenol A or tetrabromobisphenol A or a combination thereof; and
(iii) component (D), when present, is p-tertiary butyl phenol, phenol, nonyl phenol, or combination thereof.

22. A process of claim 10 wherein
(i) component (A) is a material represented by the following formulas (I) or (II)

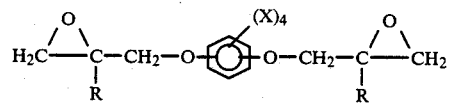
I.

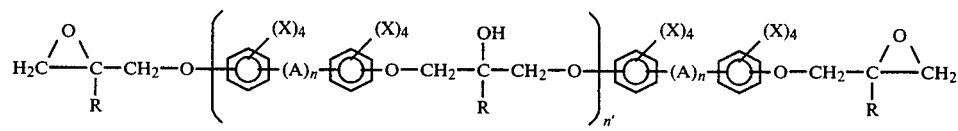

or a combination of such materials wherein each A is independently a divalent hydrocarbyl group having from 1 to about 10 carbon atoms,

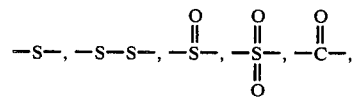

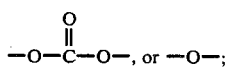

each R is independently hydrogen or a hydrocarbyl group having from 1 to about 4 carbon atoms; each X is independently hydrogen, a halogen or a hydrocarbyl or hydrocarbyloxy group having from 1 to about 12 carbon atoms; n has a value of zero or 1; and n' has an average value of from about zero to about 15;

(ii) component (B) is a material represented by the following formula (VI)

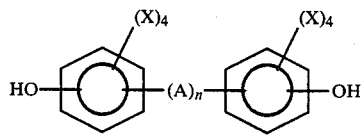

wherein each A is independently a divalent hydrocarbyl group having from 1 to about 10 carbon atoms,

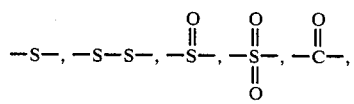

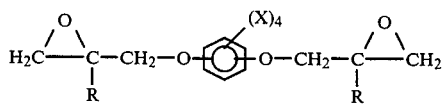

each X is independently hydrogen, a halogen or a hydrocarbyl or hydrocarbyloxy group having from 1 to about 12 carbon atoms; and n has a value of zero or 1; and (iii) component (D), when present, is represented by the following formula (IX)

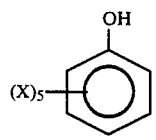

wherein each X is independently hydrogen or a hydrocarbyl or hydrocarbyloxy group having from 1 to about 12 carbon atoms.

23. A process of claim 22 wherein
(i) component (A) is represented by formula II wherein each A is independently a divalent hydrocarbyl group having from 1 to about 4 carbon atoms, each R is hydrogen, each X is independently hydrogen or bromine, n has a value of 1 and n' has an average value of from about 0.003 to about 2;
(ii) in component (B), A is a divalent hydrocarbyl group having from 1 to about 4 carbon atoms, each X is independently hydrogen or bromine and n has a value of 1; and
(iii) in component (D), each X is independently hydrogen or a hydrocarbyl group having from 3 to about 10 carbon atoms.

24. A process of claim 23 wherein
(i) component (A) is a diglycidyl ether of bisphenol A;
(ii) component (B) is bisphenol A or tetrabromobisphenol A or a combination thereof; and
(iii) component (D), when present, is p-tertiary butyl phenol, phenol, nonyl phenol, or combination thereof.

25. A process of claim 11 wherein
(i) component (A) is a material represented by the following formulas (I) or (II)

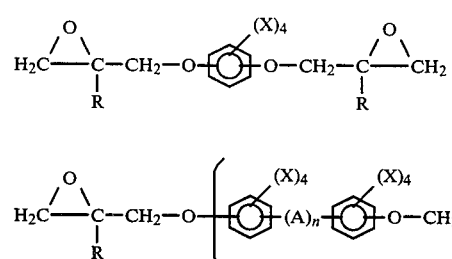

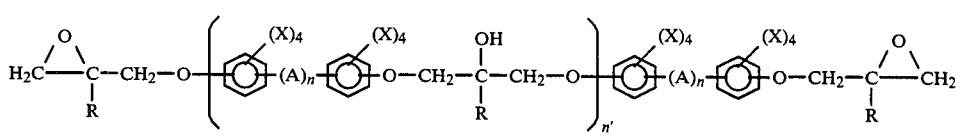

or a combination of such materials wherein each A is independently a divalent hydrocarbyl group having from 1 to about 10 carbon atoms,

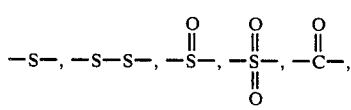

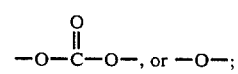

each R is independently hydrogen or a hydrocarbyl group having from 1 to about 4 carbon atoms; each X is independently hydrogen, a halogen or a hydrocarbyl or hydrocarbyloxy group having from 1 to about 12 carbon atoms; n has a value of zero or 1; and n' has an average value of from about zero to about 15;

(ii) component (B) is a material represented by the following formula (VI)

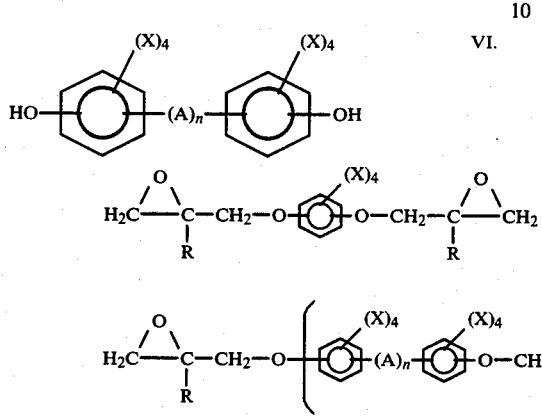

wherein each A is independently a divalent hydrocarbyl group having from 1 to about 10 carbon atoms,

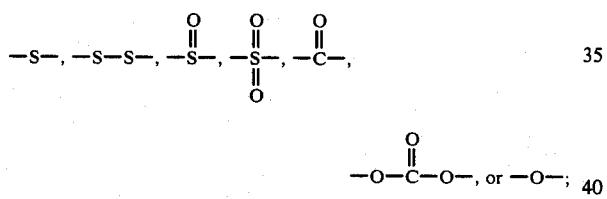

each X is indepedently hydrogen, a halogen or a hydrocarbyl or hydrocarbyloxy group having from 1 to about 12 carbon atoms; and n has a value of zero or 1; and (iii) component (D), when present, is represented by the following formula (IX)

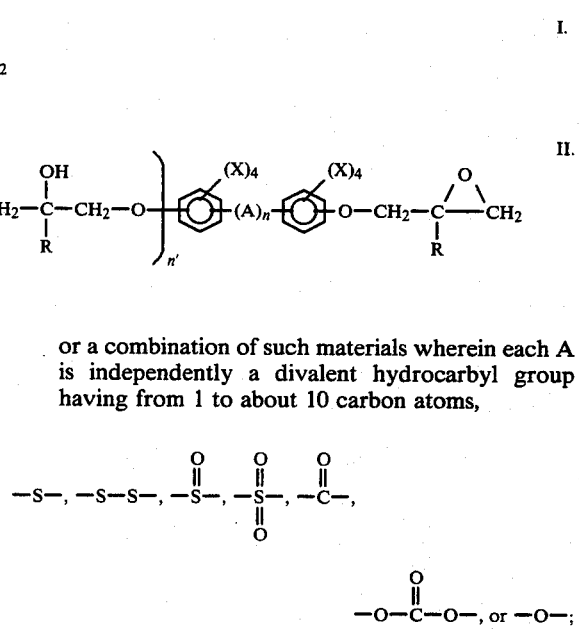

wherein each X is independently hydrogen or a hydrocarbyl or hydrocarbyloxy group having from 1 to about 12 carbon atoms.

26. A process of claim 25 wherein
(i) component (A) is represented by formula II wherein each A is independently a divalent hydrocarbyl group having from 1 to about 4 carbon atoms, each R is hydrogen, each X is independently hydrogen or bromine, n has a value of 1 and n' has an average value of from about 0.003 to about 2;
(ii) in component (B), A is a divalent hydrocarbyl group having from 1 to about 4 carbon atoms, each X is independently hydrogen or bromine and n has a value of 1; and (iii) in component (D), each X is independently hydrogen or a hydrocarbyl group having from 3 to about 10 carbon atoms.

27. A process of claim 26 wherein
(i) component (A) is a diglycidyl ether of bisphenol A;
(ii) component (B) is bisphenol A or tetrabromobisphenol A or a combination thereof; and
(iii) component (D), when present, is p-tertiary butyl phenol, phenol, nonyl phenol, or combination thereof.

28. A process of claim 12 wherein
(i) component (A) is a material represented by the following formulas (I) or (II)

or a combination of such materials wherein each A is independently a divalent hydrocarbyl group having from 1 to about 10 carbon atoms,

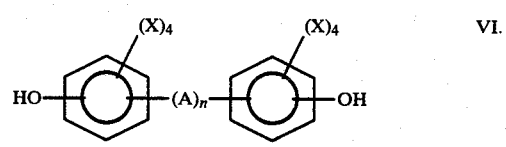

each R is independently hydrogen or a hydrocarbyl group having from 1 to about 4 carbon atoms; each X is independently hydrogen, a halogen or a hydrocarbyl or hydrocarbyloxy group having from 1 to about 12 carbon atoms; n has a value of zero or 1; and n' has an average value of from about zero to about 15;
(ii) component (B) is a material represented by the following formula (VI)

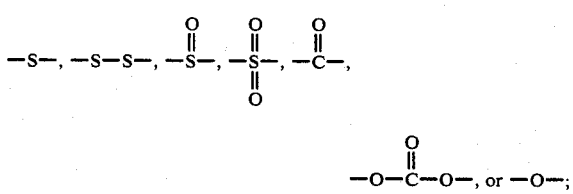

wherein each A is independently a divalent hydrocarbyl group having from 1 to about 10 carbon atoms, each X is independently hydrogen, a halogen or a hydrocarbyl or hydrocarbyloxy group having from 1 to about 12 carbon atoms; and n has a value of zero or 1; and (iii) component (D), when present, is represented by the following formula (IX)

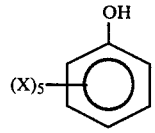

wherein each X is independently hydrogen or a hydrocarbyl or hydrocarbyloxy group having from 1 to about 12 carbon atoms.

29. A process of claim 28 wherein (i) component (A) is represented by formula II wherein each A is independently a divalent hydrocarbyl group having from 1 to about 4 carbon atoms, each R is hydrogen, each X is independently hydrogen or bromine, n has a value of 1 and n' has an average value of from about 0.003 to about 2;

(ii) in component (B), A is a divalent hydrocarbyl group having from 1 to about 4 carbon atoms, each X is independently hydrogen or bromine and n has a value of 1; and (iii) in component (D), each X is independently hydrogen or a hydrocarbyl group having from 3 to about 10 carbon atoms.

30. A process of claim 29 wherein (i) component (A) is a diglycidyl ether of bisphenol A;

(ii) component (B) is bisphenol A or tetrabromobisphenol A or a combination thereof; and (iii) component (D), when present, is p-tertiary butyl phenol, phenol, nonyl phenol, or combination thereof.

* * * * *